H. LAURIDSEN.
RESILIENT WHEEL.
APPLICATION FILED JAN. 18, 1915.

1,137,988.

Patented May 4, 1915.

Witnesses
Robert M. Sutphen
A. J. Huie

Inventor
H. Lauridsen
By Watson E. Coleman
Attorney

UNITED STATES PATENT OFFICE.

HELGE LAURIDSEN, OF MASON CITY, NEBRASKA.

RESILIENT WHEEL.

1,137,988.  Specification of Letters Patent.  Patented May 4, 1915.

Application filed January 18, 1915. Serial No. 2,878.

*To all whom it may concern:*

Be it known that I, HELGE LAURIDSEN, a citizen of the United States, residing at Mason City, in the county of Custer and State of Nebraska, have invented certain new and useful Improvements in Resilient Wheels, of which the following is a specification, reference being had to the accompanying drawings.

This invention relates to certain improvements in resilient wheels; and the object of the invention is to provide a device of this general character having novel and improved means whereby all undue shock imparted to the wheel is substantially entirely absorbed.

The invention consists in the details of construction and in the combination and arrangement of the several parts of my improved resilient wheel whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1:
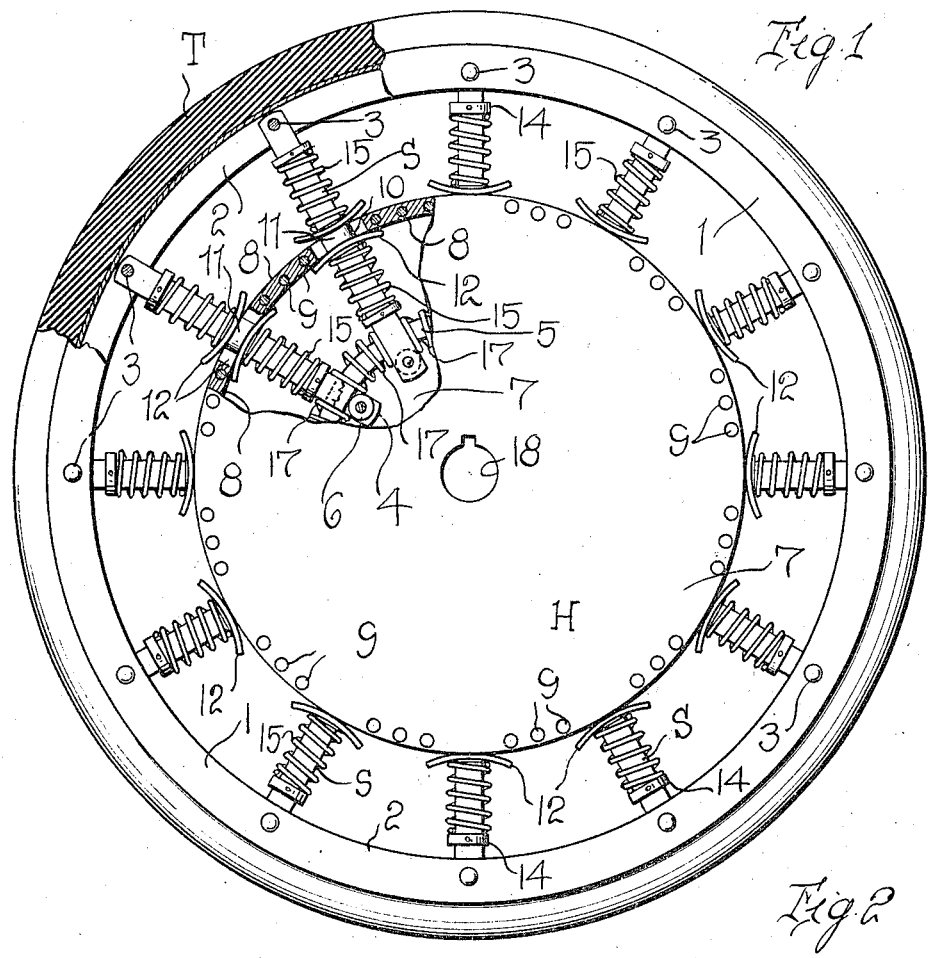
Figure 2:
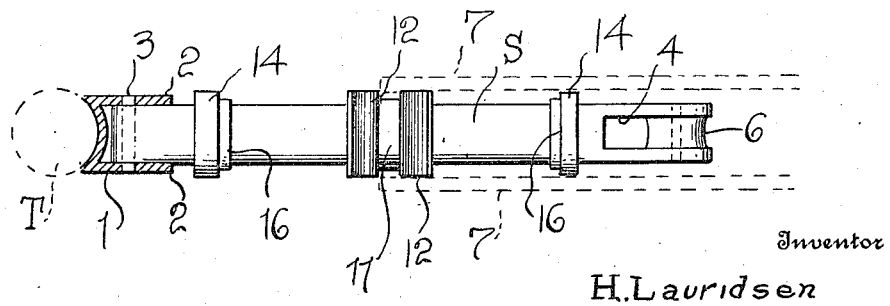

Figure 1 is a view, partly in elevation and partly in section, of a resilient wheel constructed in accordance with an embodiment of my invention; and Fig. 2 is an elevational view of a spoke comprised in my present invention, the hub structure being indicated by dotted lines and the outer rim or member being shown in section, with the coacting tire indicated by dotted lines.

As disclosed in the accompanying drawings, T denotes an outer annular rim of predetermined diameter to which is adapted to be secured in any conventional manner the tire T which may be as preferred. The rim 1 is provided adjacent its opposite sides with the inwardly disposed annular flanges 2 between which are pivotally supported through the medium of the bolts 3, the spokes S. The inner extremity of each of the spokes S is bifurcated, as at 4, to loosely straddle the annular member 5 and rotatably supported within the bifurcated extremity 4 of the spoke S is the roller 6 which serves to limit the outward movement of the spoke and permits movement thereof around the annular member 5 with a minimum of resistance, said roller being adapted to engage the inner face of the member 5.

The annular member 5 is loosely positioned between the disks 7 of the hub structure H, the peripheral portion of the disks having interposed therebetween in predetermined spaced relation, the blocks 8 maintained in operative position through the medium of the transversely disposed bolts 9, as is believed to be clearly shown in the accompanying drawings.

Positioned in each of the spaces 10 afforded by adjacent blocks 8 is a sleeve 11 through which a spoke S is loosely directed and said sleeve is provided adjacent its opposite extremities with the flanges 12 disposed on such a curvature as to afford no obstruction to the movement of the block about its pivot bolt 3. The sleeve 11 is of a diameter materially less than the extent of the space 10, for a purpose which is believed to be obvious, while the flanges 12 are of such a size as to overlie the adjacent extremities of the blocks 8. Adjacent opposite extremities, the spoke S has secured thereto the plates 14 against each of which is adapted to bear an extremity of an expansible member 15, herein disclosed as a conventional coil spring, surrounding the spoke S, while the opposite extremity of said member 15 is adapted to bear against the adjacent end of the sleeve 11 and in order to maintain such expansible member out of contact with the spoke, I provide the plate 14 and the end of the sleeve 11 with the lips 16 with which the expansible member interlocks, as is believed to be clearly apparent to those skilled in the art to which my invention appertains.

Interposed between adjacent spokes S and surrounding the annular member 5 are the expansible members 17, herein disclosed as conventional coil springs, and in practice I find that best results are attained by having the tension of the expansible members 17 in excess of the tension of the expansible members 15.

At the axial centers thereof, the disks 7 of the hub structure H are provided with the alined openings 18 whereby the wheel structure may be properly mounted upon a supporting axle.

From the foregoing description, it is thought to be obvious that a resilient wheel constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A resilient wheel comprising an outer annular member, a hub structure provided with radially disposed openings, an annular member loosely positioned within the hub, spokes pivotally engaged with the outer annular member and having their inner extremities provided with recesses in which the inner annular member is freely movable, and tensioning means coacting with each of the spokes and the hub.

2. A resilient wheel comprising an outer annular member, a hub structure provided with radially disposed openings, an annular member loosely positioned within the hub, spokes pivotally engaged with the outer annular member and having their inner extremities provided with recesses in which the inner annular member is freely movable, tensioning means coacting with each of the spokes and the hub, and tensioning means carried by the inner annular member and positioned between adjacent spokes.

3. A resilient wheel comprising an outer annular member, a hub structure provided with radially disposed openings, an annular member loosely positioned within the hub, spokes pivotally engaged with the outer annular member and having their inner extremities provided with recesses in which the inner annular member is freely movable, tensioning means coacting with each of the spokes and the hub, and anti-friction members carried by each of the spokes engageable with the inner face of the inner annular member.

4. A resilient wheel comprising an outer annular member, a hub consisting of spaced disks, spaced blocks secured between the disks adjacent the periphery thereof, spokes pivotally engaged with the outer annular member and disposed between the spaces afforded by the adjacent blocks, sleeves positioned in the spaces between adjacent blocks and through which the spokes are loosely disposed, said sleeves being provided with flanges overlying the upper and lower faces of the blocks, tensioning means operatively engaged with each of the spokes at opposite sides of its sleeve and coacting with the sleeve, and tensioning means coacting with the inner extremities of the spokes to resist the movement of the spokes about their pivotal connection with the outer annular member.

In testimony whereof I hereunto affix my signature in the presence of two witnesses.

HELGE LAURIDSEN.

Witnesses:
JNO. T. WOOD,
LOWA WOOD RUNYAI